United States Patent [19]
Wang et al.

[11] Patent Number: 6,078,370
[45] Date of Patent: Jun. 20, 2000

[54] METHOD OF CONSTRUCTING AN ARRAY OF PIXELS FOR USE IN A MULTI-PIXEL LIQUID CRYSTAL DISPLAY

[75] Inventors: Xin-Jiu Wang; Kai C. Su, both of Alpharetta, Ga.

[73] Assignee: Technology Resources International Corporation, Alpharetta, Ga.

[21] Appl. No.: 09/389,127

[22] Filed: Sep. 2, 1999

Related U.S. Application Data

[62] Division of application No. 09/213,066, Dec. 16, 1998, Pat. No. 5,982,464.

[51] Int. Cl.[7] .................. G02F 1/1347; G02F 1/1335; G02F 1/13; C09K 19/02
[52] U.S. Cl. .................. 349/75; 349/106; 349/108; 349/78; 349/180; 349/187
[58] Field of Search .................. 349/75, 78, 106, 349/108, 180, 187

[56] References Cited

U.S. PATENT DOCUMENTS

| | | | |
|---|---|---|---|
| 3,784,280 | 1/1974 | Bigelow | 350/150 |
| 3,972,590 | 8/1976 | Gelber | 350/160 |
| 4,019,807 | 4/1977 | Boswell et al. | 350/160 |
| 4,456,336 | 6/1984 | Chung et al. | 349/160 |
| 4,519,678 | 5/1985 | Komatsubara et al. | 349/160 |
| 4,637,896 | 1/1987 | Shannon | 252/299 |
| 4,659,182 | 4/1987 | Aizawa | 350/339 |
| 4,693,559 | 9/1987 | Baeger | 349/160 |
| 4,861,143 | 8/1989 | Yamazaki et al. | 349/129 |
| 4,886,343 | 12/1989 | Johnson | 350/335 |
| 4,909,606 | 3/1990 | Wada et al. | 350/347 |
| 4,968,120 | 11/1990 | Depp et al. | 350/337 |
| 4,974,941 | 12/1990 | Gibbons et al. | 350/349 |
| 5,011,624 | 4/1991 | Yamagishi et al. | 52/299 |
| 5,029,986 | 7/1991 | De Vaan | 350/338 |
| 5,032,009 | 7/1991 | Gibbons et al. | 350/341 |
| 5,073,294 | 12/1991 | Shannon et al. | 252/299 |
| 5,105,289 | 4/1992 | Sonehara et al. | 359/70 |
| 5,142,392 | 8/1992 | Ueki et al. | 359/67 |

(List continued on next page.)

OTHER PUBLICATIONS

Liquid Crystals, vol. 24, No. 3, 435–440, "Sub–twisted Nematic Liquid Crystal Display" by X.J. Wang.

*Primary Examiner*—William L. Sikes
*Assistant Examiner*—Tarifur R. Chowdhury
*Attorney, Agent, or Firm*—Needle & Rosenberg, P.C.

[57] ABSTRACT

A color display that includes an array of pixels having a top side and an opposite bottom side. Each pixel includes a material having a first optical state exhibiting birefringence and a second optical state different from the first optical state. Each pixel also includes an element capable of driving the pixel to a selected one of the first optical state or the second optical state. A first selected group of pixels of the array has a first pair of axes of optical birefringence when each pixel of the first selected group is in the first optical state and at least a second selected group of pixels of the array has a second pair of axes of optical birefringence, different from the first pair of axes of optical birefringence, when each pixel of the second selected group is in the first optical state. A reflective layer is disposed adjacent the bottom side and a polarizing layer, having a predetermined polarity orientation, is disposed adjacent the top side. The first pair of axes of optical birefringence are oriented relative to the polarity orientation so that when a first selected pixel of the first selected group of pixels is in the first optical state, light entering the first selected pixel through the polarizing layer, reflecting from the reflective layer and exiting the first selected pixel through the polarizing layer appears as a first color. Also, when the first selected pixel is in the second optical state, light exiting the first selected pixel through the polarizing layer does not appear as the first color. The second pair of axes of optical birefringence are oriented relative to the polarity orientation so that when a second selected pixel of the second selected group of pixels is in the first optical state, light entering the second selected pixel through the polarizing layer, reflecting from the reflective layer and exiting the second selected pixel through the polarizing layer appears as a second color, different from the first color. Similarly, when the second selected pixel is in the second optical state, light exiting the second selected pixel through the polarizing layer does not appear as the second color.

6 Claims, 5 Drawing Sheets

U.S. PATENT DOCUMENTS

| | | | |
|---|---|---|---|
| 5,191,454 | 3/1993 | Yoshinaga et al. | 349/88 |
| 5,243,451 | 9/1993 | Kanemoto et al. | 359/53 |
| 5,300,928 | 4/1994 | Yamazaki | 345/88 |
| 5,337,174 | 8/1994 | Wada et al. | 359/73 |
| 5,389,698 | 2/1995 | Chigrinov et al. | 522/2 |
| 5,452,113 | 9/1995 | Ikeno | 359/53 |
| 5,463,481 | 10/1995 | Yamamura | 359/53 |
| 5,473,455 | 12/1995 | Koike et al. | 359/76 |
| 5,479,282 | 12/1995 | Toko et al. | 359/75 |
| 5,500,752 | 3/1996 | Schadt et al. | 359/76 |
| 5,528,401 | 6/1996 | Narutaki et al. | 359/76 |
| 5,583,678 | 12/1996 | Nishino et al. | 349/118 |
| 5,589,959 | 12/1996 | Hikmet | 349/88 |
| 5,610,743 | 3/1997 | Tsai | 349/124 |
| 5,619,356 | 4/1997 | Kozo et al. | 349/99 |
| 5,638,197 | 6/1997 | Gunning, III et al. | 349/96 |
| 5,657,105 | 8/1997 | McCartney | 349/157 |
| 5,671,031 | 9/1997 | Nakamura et al. | 349/106 |
| 5,726,723 | 3/1998 | Wang et al. | 349/75 |
| 5,734,457 | 3/1998 | Mitsui et al. | 349/104 |
| 5,737,043 | 4/1998 | Moriwaki et al. | 349/117 |
| 5,737,045 | 4/1998 | Abileah | 349/109 |
| 5,781,265 | 7/1998 | Lee | 349/171 |
| 5,817,743 | 10/1998 | Gibbons et al. | 528/353 |

METHOD OF CONSTRUCTING AN ARRAY OF PIXELS FOR USE IN A MULTI-PIXEL LIQUID CRYSTAL DISPLAY

This application is a divisional of Ser. No. 09/213,066 filed on Dec. 16, 1998, now U.S. Pat. No. 5,982,464.

BACKGROUND OF THE INVENTION

1. Field of the Invention

The present invention relates to liquid crystal displays and, more specifically, to a color liquid crystal display (LCD) in which different pixels are capable of exhibiting different colors.

2. Description of the Prior Art

Liquid Crystal Displays (LCDs) take advantage of the ability of certain materials having a liquid crystal phase to control the transmission of visible light. Materials that have a liquid crystal phase exhibit flow characteristics similar to those of liquids, but, unlike liquids, have a certain amount of molecular ordering. Some liquid crystals also exhibit optical anisotropy, which means that light passing through the crystal is treated differently as it passes along different axes. Some of these liquid crystals also exhibit a certain amount of deformation of molecular ordering when subjected to an electric field. These liquid crystals are useful in making LCDs. A more complete description of liquid crystals and LCDs may be found in Collins, Peter J., *Liquid Crystals: Nature's Delicate Phase of Matter*, Princeton University Press, Princeton, N.J., 1990, which is incorporated herein by reference for the purpose of providing background information only.

Several types of LCDs are discussed in U.S. Pat. No. 5,726,723, which is also incorporated herein by reference. When applied to color displays, existing displays use either a plurality of color filters or dye doping of liquid crystal regions to create multiple pixels having different colors. Such displays have a first disadvantage of absorbing relatively high amounts of light, thereby making them optically inefficient (thus, making them unsuitable for low power reflective display applications). They also have a second disadvantage in that they are complicated and expensive to produce.

SUMMARY OF THE INVENTION

The disadvantages of the prior art are overcome by the present invention which, in one aspect, is a color display that includes an array of pixels having a top side and an opposite bottom side. Each pixel includes a material having a first optical state exhibiting birefringence and a second optical state different from the first optical state. Each pixel also includes an element capable of driving the pixel to a selected one of the first optical state or the second optical state. A first selected group of pixels of the array has a first pair of axes of optical birefringence when each pixel of the first selected group is in the first optical state and at least a second selected group of pixels of the array has a second pair of axes of optical birefringence, different from the first pair of axes of optical birefringence, when each pixel of the second selected group is in the first optical state. A reflective layer is disposed adjacent the bottom side and a polarizing layer, having a predetermined polarity orientation, is disposed adjacent the top side. The first pair of axes of optical birefringence are oriented relative to the polarity orientation so that when a first selected pixel of the first selected group of pixels is in the first optical state, light entering the first selected pixel through the polarizing layer, reflecting from the reflective layer and exiting the first selected pixel through the polarizing layer appears as a first color. Also, when the first selected pixel is in the second optical state, light exiting the first selected pixel through the polarizing layer does not appear as the first color. The second pair of axes of optical birefringence are oriented relative to the polarity orientation so that when a second selected pixel of the second selected group of pixels is in the first optical state, light entering the second selected pixel through the polarizing layer, reflecting from the reflective layer and exiting the second selected pixel through the polarizing layer appears as a second color, different from the first color. Similarly, when the second selected pixel is in the second optical state, light exiting the second selected pixel through the polarizing layer does not appear as the second color.

In another aspect, the display is a transmissive display that includes a first polarizing layer disposed adjacent the bottom side and a second polarizing layer disposed adjacent the top side The first polarizing layer has a first predetermined polarity orientation and the second polarizing layer has a second predetermined polarity orientation. In this aspect, the first pair of axes of optical birefringence are oriented relative to the first predetermined polarity orientation and to the second predetermined polarity orientation so that when a first selected pixel of the first selected group of pixels is in the first optical state, light entering the first selected pixel through the first polarizing layer, and exiting the first selected pixel through the second polarizing layer appears as a first color. When the first selected pixel is in the second optical state, light exiting the first selected pixel through the second polarizing layer does not appear as the first color. The second pair of axes of optical birefringence are oriented relative to the first predetermined polarity orientation and to the second predetermined polarity orientation so that when a second selected pixel of the second selected group of pixels is in the first optical state, light entering the second selected pixel through the first polarizing layer and exiting the second selected pixel through the second polarizing layer appears as a second color, different from the first color. When the second selected pixel is in the second optical state, light exiting the second selected pixel through the second polarizing layer does not appear as the second color.

Yet another aspect of the invention is a method of constructing an array of pixels for use in a multi-pixel liquid crystal display. A first substrate is coated with a photo-alignable compound, thereby forming a first orientation surface. A first mask is placed over the first orientation surface, the first mask defining a first plurality of windows, each window corresponding to a selected pixel of a first group of pixels of the display so that a first portion of the first orientation surface subtends the first plurality of windows. The first portion of the first orientation surface subtending the first plurality of windows is illuminated with a linearly polarized ultra-violet light having a first polar orientation, so that the photo-alignable compound of the first orientation surface subtending the first plurality of windows becomes cured, so as to have a first orientation. A second mask is placed over the first orientation surface, the second mask defining a second plurality of windows, each window corresponding to a selected pixel of a second group of pixels of the display so that a second portion of the first orientation surface subtends the second plurality of windows. The second portion of the first orientation surface subtending the second plurality of windows is illuminated with a linearly polarized ultra-violet light having a second polar orientation, different from the first polar orientation, so that the photo-alignable compound of the first orientation surface subtending the second plurality of windows becomes cured, so as to have a second orientation, different from the first orientation. A second substrate is coated with a photo-alignable compound, thereby forming a second orientation surface. A third mask is placed over the second orientation surface, the third mask defining a third plurality of windows, each window corresponding to a selected pixel of the first group of pixels of the display so that a first portion of the second orientation surface subtends the third plurality of windows. The first portion of the second orientation surface subtending the third plurality of windows is illuminated with a linearly polarized ultra-violet light having a third polar orientation, so that the photo-alignable compound of the second orientation surface subtending the third plurality of windows becomes cured, so as to have a third orientation. A fourth mask is placed over the second orientation surface, the fourth mask defining a fourth plurality of windows, each window corresponding to a selected pixel of the second group of pixels of the display so that a second portion of the second orientation surface subtends the fourth plurality of windows. The second portion of the second orientation surface subtending the fourth plurality of windows is illuminated with a linearly polarized ultra-violet light having a fourth polar orientation, different from the third polar orientation, so that the photo-alignable compound of the second orientation surface subtending the fourth plurality of windows becomes cured, so as to have a fourth orientation, different from the third orientation. The first substrate and the second substrate are placed parallel to each other with the first orientation surface and the second orientation surface facing each other with the first portion of the first orientation surface in alignment with the third portion of the second orientation surface, thereby defining a cavity therebetween. A liquid crystal is then injected into the cavity and the edges of the cavity are sealed with a sealant.

In yet another aspect, the invention is a method of constructing an array of pixels for use in a multi-pixel liquid crystal display, in which the photo-alignable compound may be "written over." Thus, the orientation surfaces are initially illuminated with a linearly polarized ultra-violet light having a first polar orientation, so that the photo-alignable compound of the orientation surfaces becomes cured, so as to have a first orientation. Then a mask is placed over the orientation surfaces, the mask defining a plurality of windows, each window corresponding to a selected pixel of a group of pixels of the display so that a portion of the orientation surface subtends the first plurality of windows. In this method, any areas not subsequently exposed to ultra-violet light having polar orientations other than the first polar orientation will retain the first orientation.

Yet another aspect of the-invention is a method of constructing an array of pixels for use in a multi-pixel liquid crystal display in which the substrates are coated with an orientation film that includes a guest dye to form orientation surfaces. Upon illuminating the orientation surfaces with polarized ultra-violet light, the molecules of the guest dye become aligned with the polar orientation of the polarized light.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment-of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, the term "windows," in reference to a mask, means areas that are transparent to light. Such windows could include transparent areas on a film with blackened areas, they could also include holes in a mask.

Figure 1:
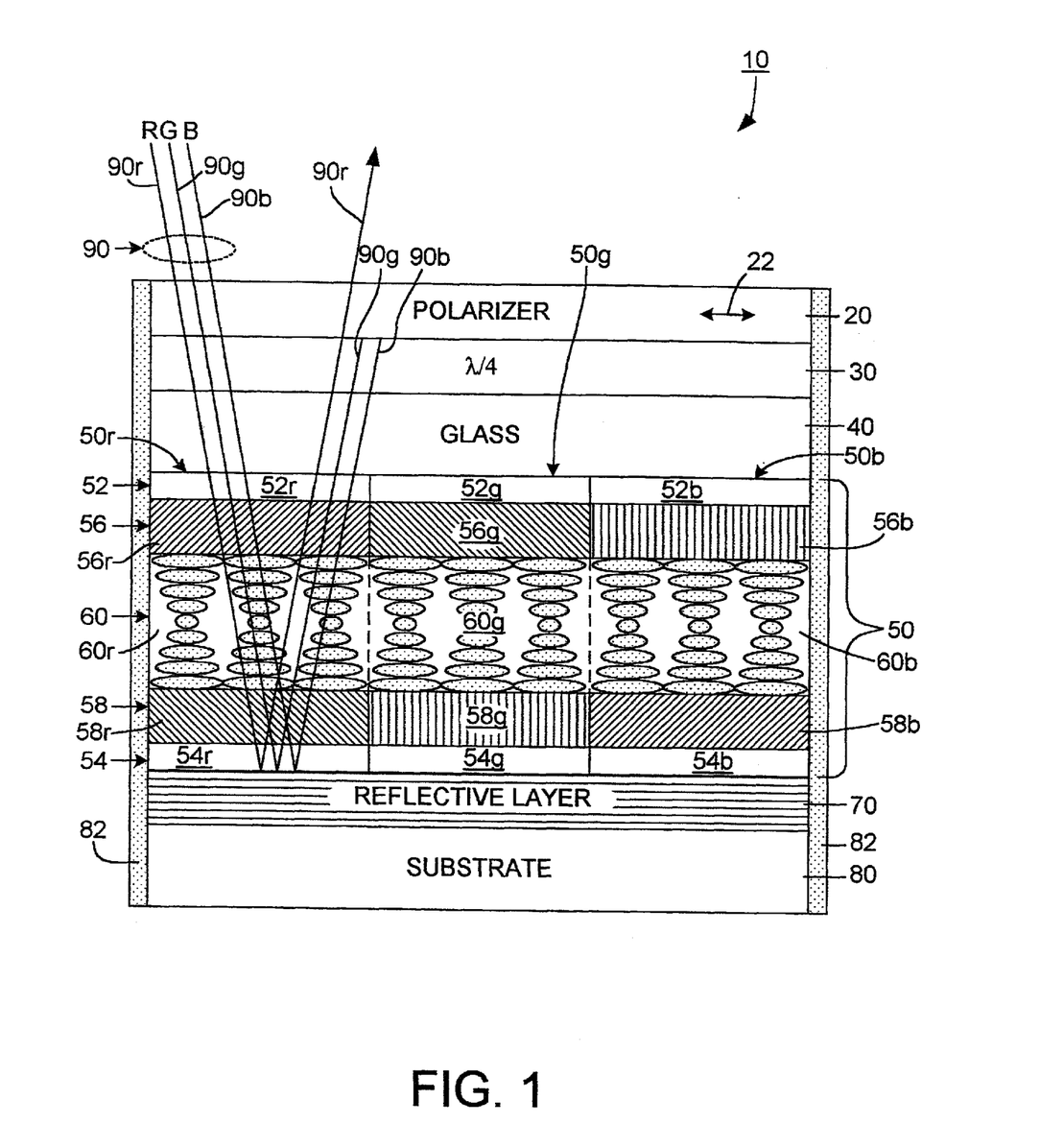
FIG. 1 is a side schematic view of three pixels of a reflective embodiment of the invention.

As shown in FIG. 1, one embodiment of the invention is a display 10 that includes an array of pixels 50. The array of pixels 50 is disposed adjacent a transparent substrate 40. Suitable materials for the substrate 40 include glass, silicon and several other transparent solids, as are known in the art of LCD design. In some applications, an anisotropic solid could be used for the substrate 40. The transparent substrate 40 is disposed above the array 50 and a reflective layer 70 disposed beneath the array 50. Beneath the reflective layer 70 is a second substrate 80. The reflective layer 70 could comprise a reflective film or one of many other types of reflective layers generally known in the field liquid crystal display technology. Disposed above the transparent substrate 40 is a quarter-wave plate 30 and a polarizing layer 20 (also referred to herein as a polarizer). The quarter-wave plate 30 could comprise calcite, mica or a polymer. A retardation film (not shown) could be used instead of a quarter-wave plate. The polarizer 20 has a first polarity orientation 22, which means that it allows light to pass therethrough only when the light has a polarity substantially the same as the first polarity orientation 22, light having other orthogonal polarizations is absorbed by the polarizer 20.

For the sake of simplicity, FIG. 1 shows an array of pixels 50 having only three pixels: a red pixel 50r, a green pixel 50g, and a blue pixel 50b. It is understood that an actual display in accordance with the invention may comprise thousands of pixels. Also, while the term "pixel" is sometimes used in the art to refer to a grouping of a red display dot, a green display dot and a blue display dot, as used herein "pixel" refers to a single dot of a display.

Generally, the array of pixels 50 comprises a liquid crystal layer 60 sandwiched between an upper orientation surface 56 and an opposite lower orientation surface 58. (It should be noted that FIG. 1 shows a plurality of ellipses in the liquid crystal layer 60. These are included to show only the presence of liquid crystal molecules. The orientation of these ellipses does not represent any actual directional or positional ordering of the liquid crystal molecules.) An upper indium tin oxide (ITO) layer 52, which acts as an electrode, is disposed above the upper orientation surface 56 and a lower ITO layer 54 is disposed below the lower orientation surface 58. (The ITO layer is not a continuous layer, but actually a plurality of discretely addressable electrodes.) Although ITO is used as the electrode in the embodiment disclosed herein, it is understood that the driving function could be accomplished using other transparent and conductive films, as are generally known to the art of LCD design. Furthermore, the display could employ an active matrix driver using, for example, a plurality of thin film transistors (TFT).

An edge sealant 82 is applied to the edges of the display 10 to prevent leakage of the liquid crystal 60 from the array of pixels 50. The edge sealant 82 also serves to maintain the space between the upper orientation surface 56 and the lower orientation surface 58. Any edge sealant commonly used with LCD's may be used.

The liquid crystal in the liquid crystal layer 60 must be a material having a nematic liquid crystal phase that exhibits at least a first optical state exhibiting birefringence when subjected to a first electrical field (including one having a zero field strength—a "field off state") and a second optical state, different from the first optical state, when subjected to a second electrical field, different from the first electrical field. The second optical state could include a state that exhibits little or no birefringence in the beam direction.

When in the first birefringent state, the liquid crystal material has two transverse axes of birefringence. This means that a component of an electromagnetic wave entering the material having an E-field vector along a plane parallel to a first of the axes will propagate through the material at a first speed, whereas a component entering the material having an e-field vector along a plane parallel to a second of the axes will propagate through the material at a second speed. Thus, the material exhibits two different indices of refraction, depending on which plane the component of an electromagnetic wave is propagating along as it enters the material. This is a property exhibited by some twisted liquid crystal materials. One such liquid crystal is a twisted nematic liquid crystal having a twist angle of greater than 90° such as a chiral-doped non-compensated supertwisted nematic liquid crystal (XSTN). Other types of nematic liquid crystals will work with the present invention, including twisted nematic (TN), super-twisted nematic (STN) and sub-twisted nematic (SbTN). For any one of these types of liquid crystal to be used in the invention, it must have a phase that exhibits birefringence.

Examining the array of pixels 50 in detail, the red pixel 50r includes: an upper electrode 52r, an upper orientation sub-surface 56r, a liquid crystal region 60r, a lower orientation sub-surface 58r, and a lower electrode 54r. Similarly, the green pixel 50g includes: an upper electrode 52g, an upper orientation sub-surface 56g, a liquid crystal region 60g, a lower orientation sub-surface 58g, and a lower electrode 54g, and the blue pixel 50b includes: an upper electrode 52b, an upper orientation sub-surface 56b, a liquid crystal region 60b, a lower orientation sub-surface 58b, and a lower electrode 54b.

The liquid crystal regions 60r,g,b of each pixel 50r,g,b have different axes of birefringence. This is because the red pixel liquid crystal region 60r has a different twist orientation than that of green pixel liquid crystal region 60g and blue pixel liquid crystal region 60b. Similarly, the green pixel liquid crystal region 60g has a different twist orientation than that of red pixel liquid crystal region 60r and blue pixel liquid crystal region 60b. Likewise, the blue pixel liquid crystal region 60b has a different twist orientation than that of red pixel liquid crystal region 60r and green pixel liquid crystal region 60g. In this embodiment, the liquid crystal 60 is of the XSTN type, has a thickness of, e.g., 670 nm and a thickness over intrinsic pitch (resulting from chiral doping) of, e.g., 0.43. By having different twist orientations, the liquid crystal in the different regions have different axes of birefringence while in the field off state.

The liquid crystal used is any of the common nematic liquid crystals used in LCD's. The chiral dopant could comprise S811 or CB15 (among others) and could have a concentration of about 0.1% when using a TN or SbTN embodiment and 0.5% when using STN or XSTN.

The twist orientation, as used herein, is a function of the liquid crystal's twist angle and upper surface anchoring direction. The upper surface anchoring direction is the angle from the polar orientation 22 of the polarizer 20 to the director of the liquid crystal 60 adjacent the upper orientation sub-surface 56. (The director of a liquid crystal is an imaginary line corresponding to the direction that any given liquid crystal molecule is most likely to be oriented.) The twist angle is the amount of angular rotation of the liquid crystal director as it moves from the upper orientation sub-surface 56 to the lower orientation subsurface 58.

In this embodiment, the liquid crystal 60r of the red pixel 50r has an upper surface anchoring direction of −2° and a twist angle of 190°. The liquid crystal 60g of the green pixel 50g has an upper surface anchoring direction of 17° and a twist angle of 190°. The liquid crystal 60b of the blue pixel 50b has an upper surface anchoring direction of 25° and a twist angle of 165°. Many other twist angles and surface anchoring directions may be employed without departing from the scope of the invention.

Figure 2:
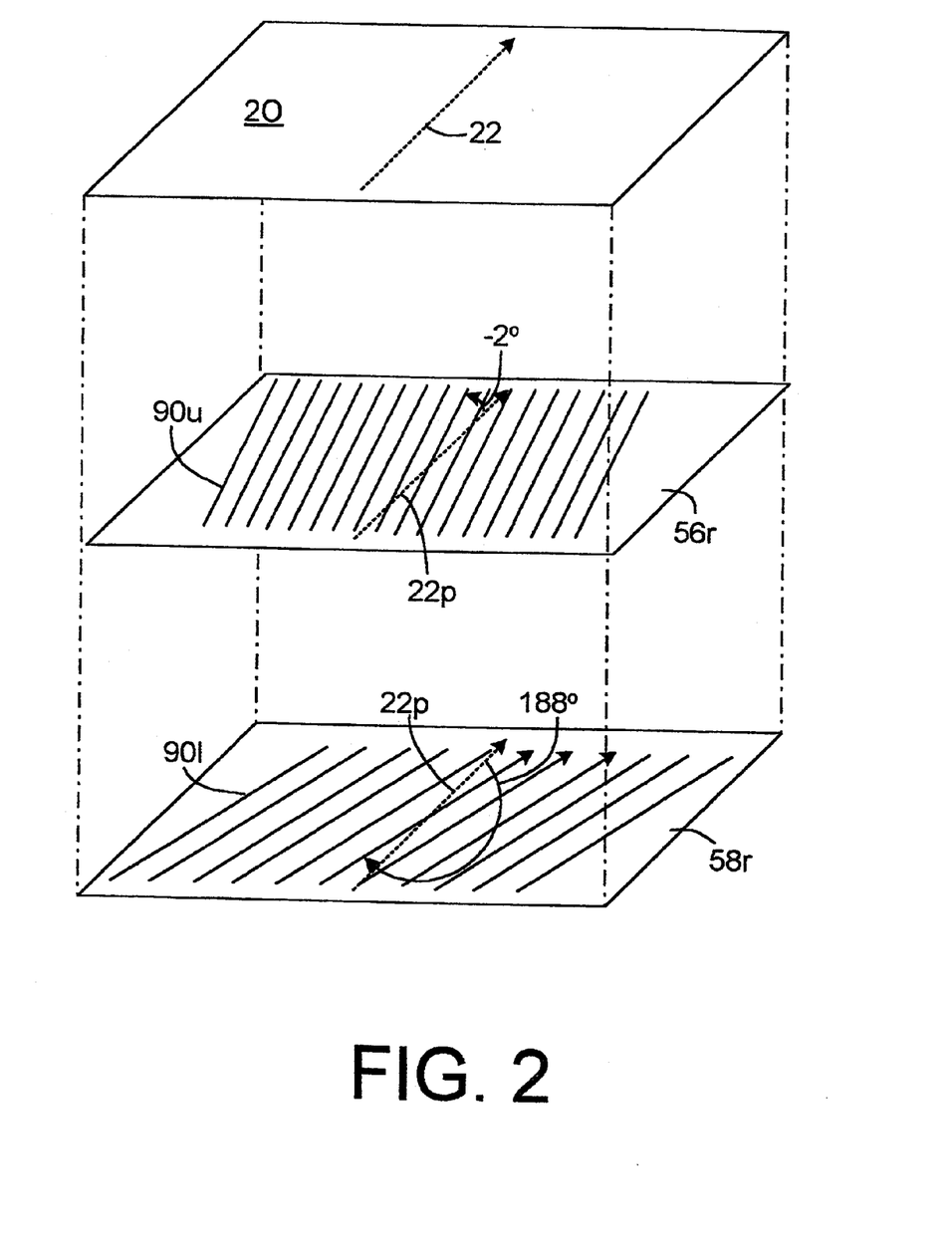
FIG. 2 is an exploded diagram of the polarizer and the orientation surfaces of the red pixel shown in FIG. 1, demonstrating how twist angle is achieved in the liquid crystal.

The twist angle is achieved because liquid crystals tend to orient themselves with molecular orientations on surfaces to which they are adjacent. For example, as shown in FIG. 2, the upper orientation sub-surface 56r of the red pixel 50r has upper surface molecular orientations 90u that run parallel to a −2° angle from the polar orientation 22 of the polarizer. Similarly, the corresponding lower orientation sub-surface 58r has molecular orientations 90l that run parallel to a 188° angle from the polar orientation 22. When a liquid crystal material is injected into the region between the upper orientation sub-surface 56r and the lower orientation sub-surface 58r, the liquid crystal molecules near the upper orientation subsurface 56r tend to align themselves with the upper surface molecular orientations 90u so that they are parallel to a −2° angle from the polar orientation 22. The same process occurs with the liquid crystal molecules near the lower orientation sub-surface 58r, causing them to align themselves parallel to a 188° angle from the polar orientation 22. The liquid crystal molecules in-between tend to align themselves with their nearest neighbors so that the director of the liquid crystal tends to rotate from alignment with the molecular orientations on the upper orientation sub-surface 56r to alignment with the molecular orientations on the lower orientation sub-surface 58r in a helical fashion. A small amount of a chiral dopant is added to the twisted nematic liquid crystal, thus making a chiral doped liquid crystal, to ensure that the director uniformly rotates in one direction (i.e., clockwise or counterclockwise) from upper to lower throughout the liquid crystal layer 60. The twisting process is the same for both the green pixel 50g and the blue pixel 50b.

The orientation sub-surfaces 56r and 58r of the red pixel 50r have molecular orientations that are different from the molecular orientations of the orientation sub-surfaces 56g and 58*g* of the green pixel 50*g* and the orientation subsurfaces 56*b* and 58*b* of the blue pixel 50*b*, which also have different molecular orientations from each other.

To understand the operation of this embodiment, returning to FIG. 1, consider a beam of white light 90 entering the display 10. (The beam shown is simplified as having only a red component 90*r*, a green component 90*g* and a blue component 90*b*. This is a simplification, as white light may comprise many different components from the entire spectrum of visible light.) If, hypothetically only, the liquid crystal 60 were absent, then components having a polarization substantially the same as the polarization orientation 22 would pass through the polarizer 20, whereas the other components would be absorbed by the polarizer 20. The quarter-wave plate 30 would change the polarization of the beam 90 from linear polarization along one axis (for example x-linear polarization) to circular polarization. The light would then be reflected off of the reflective layer 70 and the polarization of the reflected beam would changed from circular polarization to linear polarization along a second, orthogonal axis (for example y-linear polarization) by the quarter wave plate 30 so that the polarizer 20 would now act as a crossed polarizer to the polarization axis of the beam 90. Thus all components of the beam 90, including the red component 90*r*, would be absorbed by the polarizer 20 and the display 10 would appear dark. The above example is hypothetical and presented only to facilitate understanding of the display 10. In an actual embodiment, liquid crystal 60 would be present at all times.

Now consider the beam 90 in an actual system, in which the liquid crystal 60 is present, as it passes through the red pixel 50*r* while no voltage is applied between the upper electrode 52*r* and the lower electrode 54*r* (this is referred to herein as the "field off state"). When in the field off state, the liquid crystal 60*r* is in a first optical state exhibiting birefringence. As the beam passes through the polarizer 20, only those components of the beam 90 having a polarization axis parallel to the polarization orientation 22 pass through the polarizer 20, with the remaining components being absorbed by the polarizer 20. The quarter-wave plate 30 changes the polarization of the beam 90 from linear to circular, as before.

Because the liquid crystal 60*r* is an anisotropic medium that exhibits optical birefringence while in the first optical state, the polarization axis of the beam 90 is changed by the liquid crystal 60*r*. Actually, the beam 90 comprises several different components 90*r,g,b* of different wavelengths and the anisotropy of the liquid crystal 60*r* causes different amounts of polarization rotation, or other optical effect, for different wavelengths. Therefore, the liquid crystal 60*r* rotates the polarizations of the red component 90*r*, the green component 90*g* and the blue component 90*b* by different amounts.

In the liquid crystal 60*r*, the amount of birefringence is a function of the twist angle, the thickness and the birefringence of the liquid crystal 60*r*. Thus, in the red region of the liquid crystal, the thickness, the upper surface anchoring direction, and the twist angle are all chosen so that when the red pixel 50*r* is in the field off state, the polarization of the red component 90*r* will be rotated by a total of 90° as it makes the complete trip through the liquid crystal 60*r*, reflects off of the reflective layer 70 and passes out of the liquid crystal 60*r*. Therefore, once the red component 60*r* exits the quarter-wave plate 30 on the return trip from the reflective layer 70, its polarization axis has been rotated by a total of 180° from the polarization orientation 22 of the polarizer 20, thereby allowing it to pass through the polarizer 20 with relatively little attenuation. On the other hand, the liquid crystal 60*r* does not rotate the polarization axes of the green component 90*g* and the blue component 90*b* in the same way as it rotates the red component 90*r*. The final rotation is such that the polarization orientations of these components are something other than the amount necessary to make the polarization orientations parallel to the polarization orientation 22 of the polarizer 20. Thus, the green component 90*g* and the blue component 90*b* are substantially absorbed by the polarizer 20. Therefore, the red pixel 50*r* appears red in the field-off state, as only light of the red component 90*r* of the beam 90 passes out of the red pixel 50*r*.

This situation changes drastically when a voltage is applied between the upper electrode 52*r* and the lower electrode 54*r*, putting the pixel 54*r* in the "field-on" state. (In this embodiment, the field-on state occurs when a voltage above a deformation threshold for the liquid crystal is applied between electrodes 52 and 54. The "field-off" state is when the voltage is below that threshold, even though there might actually be an electric field between the electrodes during the field-off state.) In this case an electric field exists between the two electrodes 52*r* and 54*r* which causes deformation of the ordering of the liquid crystal 60*r*. This deformation puts the liquid crystal 60*r* into a second optical state (which could be exhibiting either different birefringence or no birefringence). In this state, the red component 90*r*, as well as the green component 90*g* and the blue component 90*b* are not rotated by the precise amount necessary for any of the components of the beam 90 to be allowed to pass through the polarizer. Therefore, the red pixel 50*r* appears dark when in the field-on state.

The optical process is the same for both the green pixel 50*g* and the blue pixel 50*b*. Therefore, by controlling the voltages applied to the electrodes 52*r,g,b* and 54*r,g,b*, the display can selectively allow transmittance of red light, green light or blue light from the red pixel 50*r*, the green pixel 50*g* or the blue pixel 50*b*, respectively, or these pixels may appear dark. As is generally understood in the art of display design, by combining light of these three colors, the display 10 can be made to appear to be transmitting most of the colors of the visible spectrum. If the quarter wavelength plate 30 were removed from this embodiment, then each pixel 50 would appear as a complimentary color to the one recited above while the pixel 50 is in the field-off state.

Figure 3:
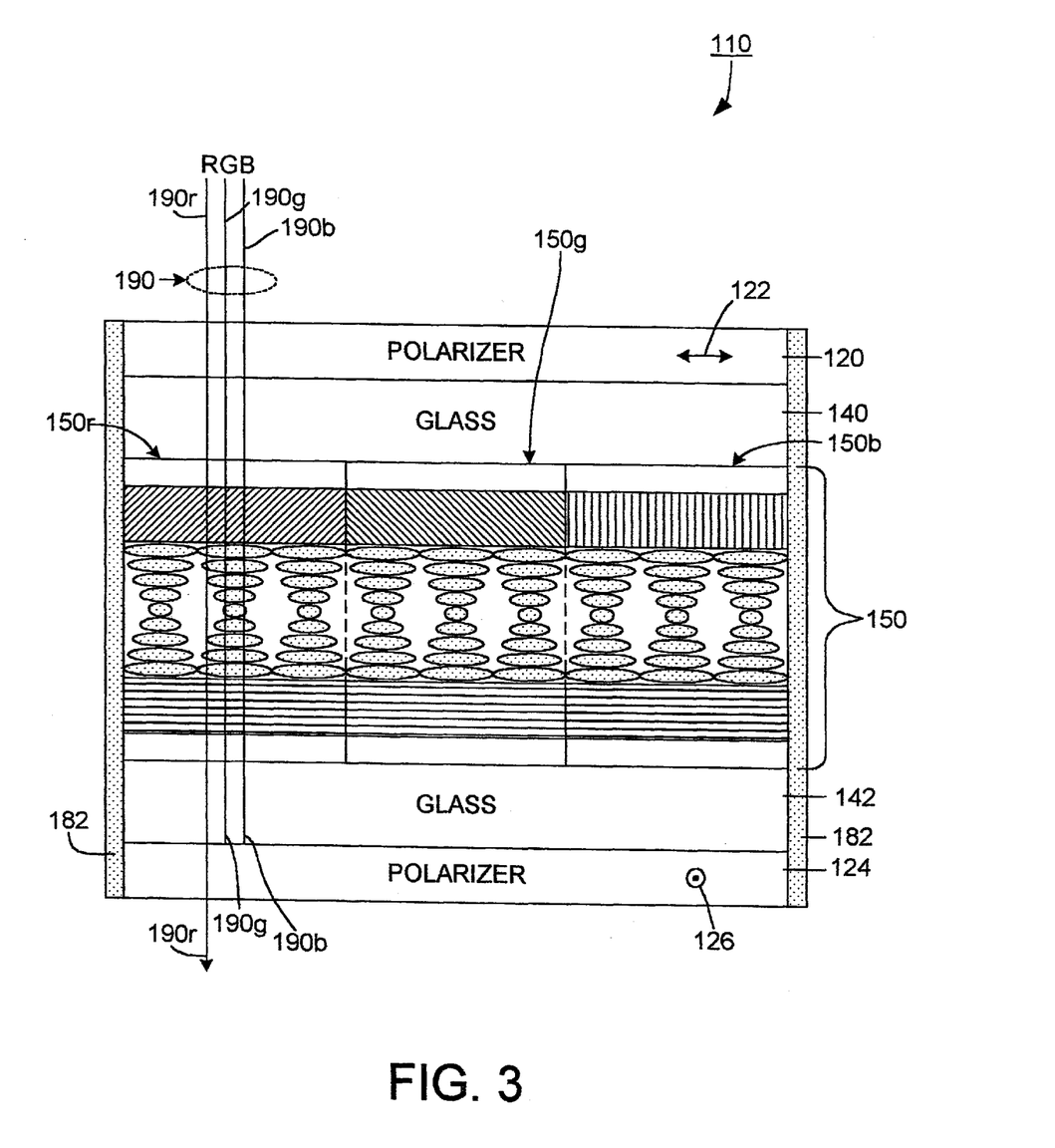
FIG. 3 is a side schematic view of three pixels of a transmissive embodiment of the invention.

As shown in FIG. 3, a transmissive liquid crystal display 110 in accordance with the invention includes an array of pixels 150 (including red 150*r*, green 150*g* and blue 150*b*) that has a first polarizer 120 and transparent substrate 140 disposed above the array 150. However, unlike the reflective embodiment of FIG. 1, the transmissive embodiment does not include a reflective layer. Instead, it has a second transparent substrate 142 and a second polarizer 124 disposed beneath it. In this example, the second polarizer 124 has a polarization orientation 126 that is orthogonal to the polarization orientation 122 of the first polarizer 120. In other embodiments, polarization orientation 126 is not necessarily orthogonal to polarization orientation 122.

When a beam of light 190 enters the red pixel 150*r* (for example) while in the field off state, the birefringence of the liquid crystal in the pixel 150*r* causes the red component 190*r* to rotate by 90°, while causing the other components 190*g,b* to rotate by an amount other than 90°. Thus, the red component 190*r* has a polarization orientation that allows it to pass through the second polarizer 124 and the blue and green components 190*g,b* have polarization orientations that cause them to be substantially absorbed by the second polarizer 124. In the field on state, none of the components 190r,g,b have polarization orientations that would allow them to pass through the second polarizer 124, causing the pixel 150r to appear dark. Again, the process is the same for the green pixel 150g and the blue pixel 150b. This embodiment could be used as part of back-lit display or a projection display.

With the addition of a half-wave plate (not shown) the display 110 could be changed from a positive mode display to a negative mode display. A negative mode display is one in which the opposites of the primary colors are transmitted by the display (such as a cyan, magenta, yellow—CMY—display).

In one embodiment of a transmissive display, in accordance with FIG. 3, the product of the birefringence and the cell thickness is 900 nm. The bottom surface anchoring direction of all pixels is 45° from the second polarization orientation 126. The top surface anchoring direction of the red pixel 150r is 28° from the first polarization orientation 122. The top surface anchoring direction of the green pixel 150g is 54° and the top surface anchoring direction of the blue pixel 150b is 68°. Thus, the red pixel twist angle is 217°, the green pixel twist angle is 191° and the blue pixel twist angle is 177°.

Figure 4:
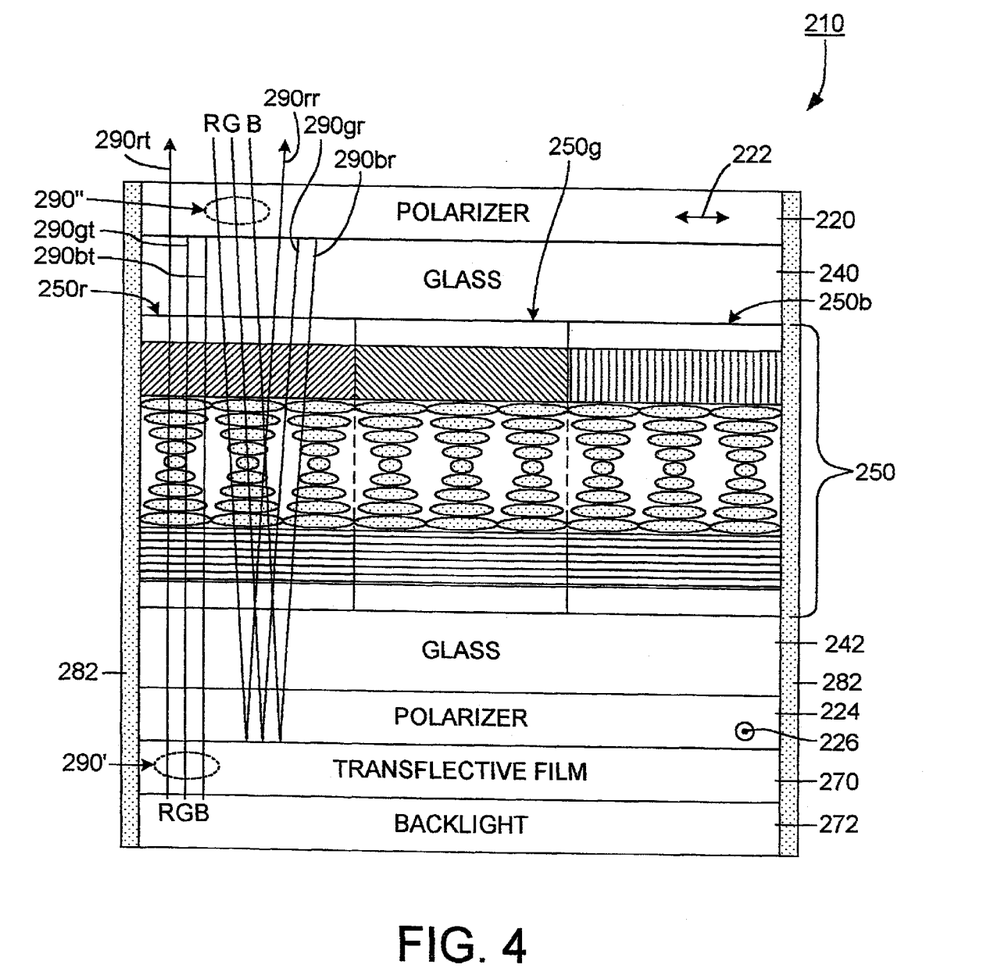
FIG. 4 is a side schematic view of three pixels of a transflective embodiment of the invention.

A hybrid of the embodiments shown in FIGS. 1 and 3 is shown in FIG. 4. In this "transflective" embodiment, the display 210 has a partially reflective film 270 (a "transflective" film) disposed adjacent the second polarizer 224 and a backlight 272 is disposed adjacent the transflective film 270. In conditions where there is ample ambient light 290", the backlight 272 is turned off and the display 210 works in the reflective mode, thereby conserving battery power. At times were there is insufficient ambient light, the backlight 272 is turned on so as to generate light 290' and the display 210 works in the transmissive mode. (In FIG. 4, the beam components exiting the display in the transmissive mode are designated 290rt, 290gt and 290bt. The beam components exiting the display in the reflective mode are designated 290rr, 290gr and 290br.)

One process that could be employed to make the orientation surfaces of a display in accordance with the invention is shown in FIGS. 5A–5G. The example given will describe the making of the top orientation-surface of an RGB display. However, the same process is used in making the bottom orientation surface. Also, this process could be employed in making a display of any color arrangement, in accordance with the invention.

Figures 5A, 5C:
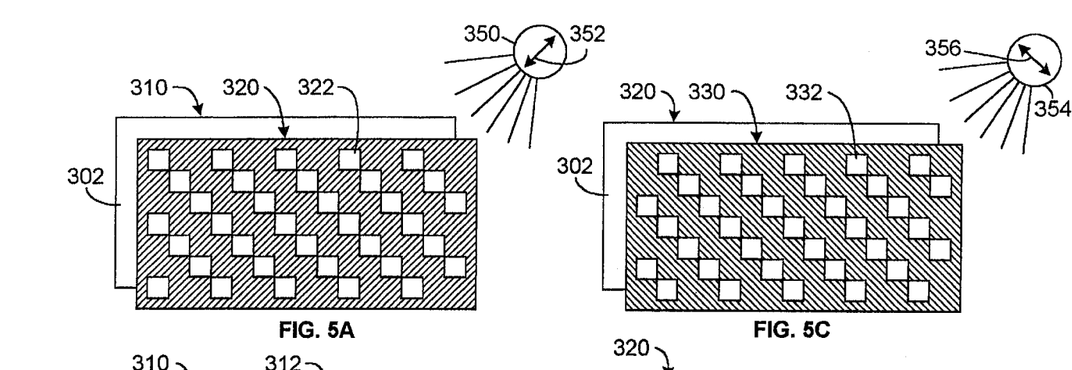
FIGS. 5A–5G are schematic diagrams showing the process employed in making the invention.

First, as shown in FIG. 5A, a substrate 310 is coated with a photo-alignable compound. Such a compound could include a pre-polymer. This forms an orientation surface 302. A first mask 320 is placed over the orientation surface 302. The first mask defines a first plurality of windows 322, with each window 322 corresponding to a selected pixel type (such as a red pixel) of the display. Thus, a first portion of the orientation surface 302 subtends the first plurality of windows 322.

Next, the first portion of the orientation surface 302 is illuminated with a linearly polarized light 350 having a first polar orientation 352. In one embodiment, the light could be ultra-violet in the range of 300 nm to 360 nm, however other wavelengths of light could also be employed. The first polar orientation 352 is parallel (or could be perpendicular) to the top surface anchoring direction of the red pixel. The photo-alignable compound of the orientation surface 302 subtending the first plurality of windows 322 becomes cured so as to have a first orientation. If the photo-alignable compound is a cross linkable polymer, then the curing process occurs when the molecules of the polymer become cross-linked.

Figures 5B, 5D, 5E, 5F, 5G:
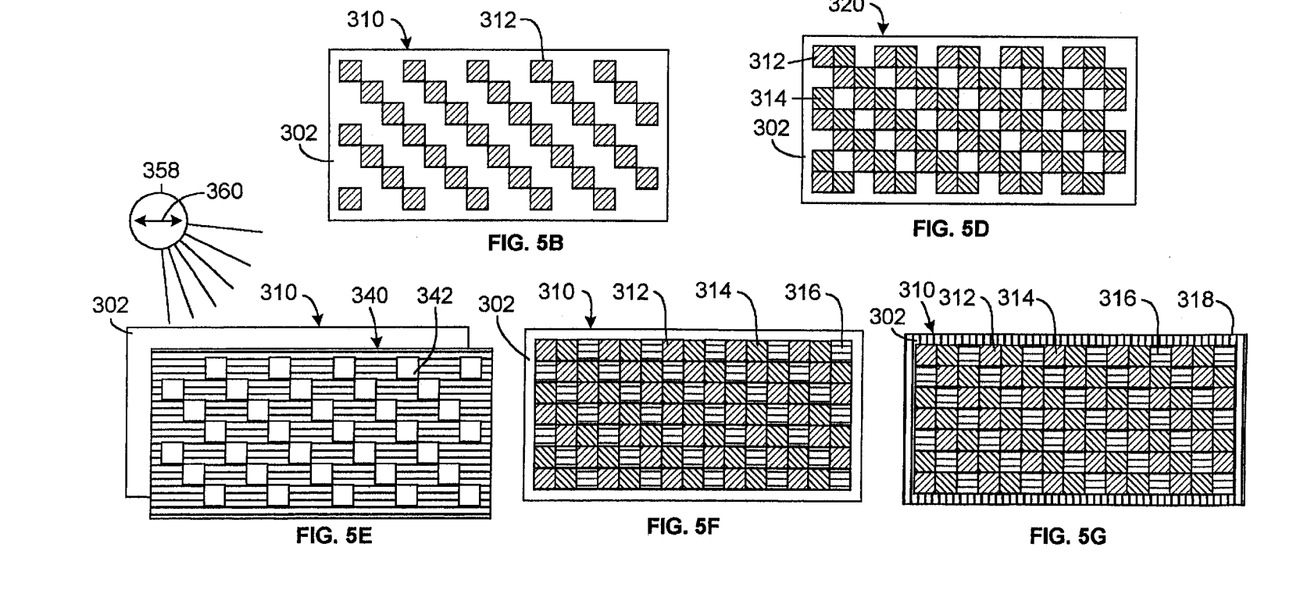

The result of this step, as shown in FIG. 5B, is that the orientation surface 302 has a plurality of areas 312 that have a first molecular orientation. These areas 312 will serve to anchor the liquid crystal of the red pixels.

Next, as shown in FIG. 5C, a second mask 330 is placed over the orientation surface 302. The second mask 330 defines a second plurality of windows 332, each of which corresponding to a pixel type (e.g., green) of the display.

The portion of the orientation surface 302 subtending the second plurality of windows 332 is then illuminated with a linearly polarized light 354 having a second polar orientation 356, corresponding to the top surface anchoring angle of the green pixels. The illumination continues until the photo-alignable compound of the orientation surface 302 subtending the second plurality of windows 332 becomes cured. This forms a second plurality of areas 314 that have a second molecular orientation. These areas 314 will serve to anchor the liquid crystal of the green pixels. The result of this step is shown if FIG. 5D.

As shown in FIG. 5E, this process is repeated using a third mask 340 having a third plurality of windows 342 and a third linearly polarized light 358 having a third polarization orientation 360. As shown in FIG. 5F, this results in the orientation surface 302 having a third plurality of areas 316 having a third molecular orientation, in addition to the first plurality of areas 312 and the second plurality of areas 314. These areas 316 will serve to anchor the liquid crystal of the blue pixels.

Optionally, as shown in FIG. 5G, a mask allowing light to pass around all of the pixel areas can be used to generate a background area 318, thereby creating a display having a controllable background color.

Some photo-alignable materials allow themselves to be "written over" so that their molecules will first align themselves with a first light and subsequently align themselves with a second light. Using one of these types of materials, it would be possible to do away with one of the masks recited above. For example, the first step would involve illuminating the entire orientation surface with a first linearly polarized light and then following the steps shown in FIGS. 5C–5G.

In the process disclosed above, the photo-curable polymer could be a photo polymer available from Elsicon, Inc., Quillen Building, Suite 1C, 3521 Silverside Road, Wilmington, Del. 19810. The masks would be similar to the type of masks used in semiconductor photolithography (although this embodiment would not require the same level of precision as that required in manufacturing integrated circuits). The ITO layers could be applied using one of several methods commonly used in LCD technology.

It is important to note that the above-described figures of the drawings disclosed herein are not drawn to scale. Certain features are exaggerated to aid in explaining the invention.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of constructing an array of pixels for use in a multi-pixel liquid crystal display, comprising the steps of:
    a. coating a first substrate with a photo-alignable compound, thereby forming a first orientation surface;
    b. placing a first mask over the first orientation surface, the first mask defining a first plurality of windows, each window corresponding to a selected pixel of a first group of pixels of the display so that a first portion of the first orientation surface subtends the first plurality of windows;

c. illuminating the first portion of the first orientation surface subtending the first plurality of windows with a linearly polarized light having a first polar orientation, so that the photo-alignable compound of the first orientation surface subtending the first plurality of windows becomes cured, so as to have a first orientation;

d. placing a second mask over the first orientation surface, the second mask defining a second plurality of windows, each window corresponding to a selected pixel of a second group of pixels of the display so that a second portion of the first orientation surface subtends the second plurality of windows;

e. illuminating the second portion of the first orientation surface subtending the second plurality of windows with a linearly polarized light having a second polar orientation, different from the first polar orientation, so that the photo-alignable compound of the first orientation surface subtending the second plurality of windows becomes cured, so as to have a second orientation, different from the first orientation;

f. coating a second substrate with a pre-polymer, thereby forming a second orientation surface;

g. placing a third mask over the second orientation surface, the third mask defining a third plurality of windows, each window corresponding to a selected pixel of the first group of pixels of the display so that a first portion of the second orientation surface subtends the third plurality of windows;

h. illuminating the first portion of the second orientation surface subtending the third plurality of windows with a linearly polarized light having a third polar orientation, so that the photo-alignable compound of the second orientation surface subtending the third plurality of windows becomes cured, so as to have a third orientation;

i. placing a fourth mask over the second orientation surface, the fourth mask defining a fourth plurality of windows, each window corresponding to a selected pixel of the second group of pixels of the display so that a second portion of the second orientation surface subtends the fourth plurality of windows;

j. illuminating the second portion of the second orientation surface subtending the fourth plurality of windows with a linearly polarized light having a fourth polar orientation, different from the third polar orientation, so that the photo-alignable compound of the second orientation surface subtending the fourth plurality of windows becomes cured, so as to have a fourth orientation, different from the third orientation;

k. placing the first substrate and the second substrate parallel to each other with the first orientation surface and the second orientation surface facing each other, thereby defining a cavity therebetween; and l. injecting a liquid crystal into the cavity.

2. The method of claim 1, further comprising the steps of:

a. placing a fifth mask over the first orientation surface, the fifth mask defining a transparent area corresponding to a first background area surrounding at least a portion of the first group of pixels and the second group of pixels so that a first background portion of the first orientation surface subtends the background area;

b. illuminating the first background portion of the first orientation surface subtending the first background area with a linearly polarized light having a fifth polar orientation, different from the first, second, third and fourth polar orientations, so that the photo-alignable compound of the first orientation surface subtending the first background area becomes cured, so as to have a fifth orientation, different from the first, second, third and fourth orientations;

c. placing a sixth mask over the second orientation surface, the sixth mask defining a transparent area corresponding to a second background area surrounding at least a portion of the first group of pixels and the second group of pixels so that a second background portion of the second orientation surface subtends the background area; and d. illuminating the second background portion of the second orientation surface subtending the second background area with a linearly polarized light having a sixth polar orientation, different from the first, second, third and fourth polar orientations, so that the photo-alignable compound of the second orientation surface subtending the second background area becomes cured, so as to have a sixth orientation, different from the first, second, third, fourth and fifth orientations.

3. The method of claim 1, wherein the photo-alignable compound comprises a prepolymer.

4. The method of claim 1, wherein the photo-alignable compound comprises a polymer capable of being cross-linked.

5. A method of constructing an array of pixels for use in a multi-pixel liquid crystal display, comprising the steps of:

a. coating a first substrate with a photo-alignable compound, thereby forming a first orientation surface;

b. illuminating the first orientation surface with a linearly polarized light having a first polar orientation, so that the photo-alignable compound of the first orientation surface becomes cured, so as to have a first orientation;

c. placing a first mask over the first orientation surface, the first mask defining a first plurality of windows, each window corresponding to a selected pixel of a first group of pixels of the display so that a first portion of the first orientation surface subtends the first plurality of windows;

d. illuminating the first portion of the first orientation surface subtending the first plurality of windows with a linearly polarized light having a second polar orientation, so that the photo-alignable compound of the first orientation surface subtending the first plurality of windows becomes cured, so as to have a second orientation;

e. coating a second substrate with a pre-polymer, thereby forming a second orientation surface;

f. illuminating the second orientation surface with a linearly polarized light having a third polar orientation, so that the photo-alignable compound of the second orientation surface becomes cured, so as to have a third orientation;

g. placing a second mask over the second orientation surface, the second mask defining a second plurality of windows, each window corresponding to a selected pixel of the first group of pixels of the display so that a first portion of the second orientation surface subtends the second plurality of windows;

h. illuminating the first portion of the second orientation surface subtending the second plurality of windows with a linearly polarized light having a fourth polar orientation, so that the photo-alignable compound of the second orientation surface subtending the second plurality of windows becomes cured, so as to have a fourth orientation;

i. placing the first substrate and the second substrate parallel to each other with the first orientation surface and the second orientation surface facing each other, thereby defining a cavity therebetween; and j. injecting a liquid crystal into the cavity.

6. A method of constructing an array of pixels for use in a multi-pixel liquid crystal display, comprising the steps of:

a. coating a first substrate with an orientation film including a guest dye, thereby forming a first orientation surface;

b. placing a first mask over the first orientation surface, the first mask defining a first plurality of windows, each window corresponding to a selected pixel of a first group of pixels of the display so that a first portion of the first orientation surface subtends the first plurality of windows;

c. illuminating the first portion of the first orientation surface subtending the first plurality of windows with a linearly polarized light having a first polar orientation, so that molecules of the guest dye of the first orientation surface subtending the first plurality of windows become aligned with the first polar orientation;

d. placing a second mask over the first orientation surface, the second mask defining a second plurality of windows, each window corresponding to a selected pixel of a second group of pixels of the display so that a second portion of the first orientation surface subtends the second plurality of windows;

e. illuminating the second portion of the first orientation surface subtending the second plurality of windows with a linearly polarized light having a second polar orientation, different from the first polar orientation, so that molecules of the guest dye of the first orientation surface subtending the second plurality of windows become aligned with the second polar orientation;

f. coating a second substrate with a pre-polymer, thereby forming a second orientation surface;

g. placing a third mask over the second orientation surface, the third mask defining a third plurality of windows, each window corresponding to a selected pixel of the first group of pixels of the display so that a first portion of the second orientation surface subtends the third plurality of windows;

h. illuminating the first portion of the second orientation surface subtending the third plurality of windows with a linearly polarized light having a third polar orientation, so that molecules of the guest dye of the second orientation surface subtending the third plurality of windows become aligned with the third polar orientation;

i. placing a fourth mask over the second orientation surface, the fourth mask defining a fourth plurality of windows, each window corresponding to a selected pixel of the second group of pixels of the display so that a second portion of the second orientation surface subtends the fourth plurality of windows;

j. illuminating the second portion of the second orientation surface subtending the fourth plurality of windows with a linearly polarized light having a fourth polar orientation, different from the third polar orientation, so that molecules of the guest dye of the second orientation surface subtending the fourth plurality of windows become aligned with the fourth polar orientation;

k. placing the first substrate and the second substrate parallel to each other with the first orientation surface and the second orientation surface facing each other, thereby defining a cavity therebetween; and l. injecting a liquid crystal into the cavity.

* * * * *